US010505651B1

(12) United States Patent
Garrett

(10) Patent No.: US 10,505,651 B1
(45) Date of Patent: Dec. 10, 2019

(54) PRECISION TIME SYNCHRONIZATION OVER STANDARDIZED NETWORKING PROTOCOLS

(71) Applicant: WHELEN ENGINEERING COMPANY, INC., Chester, CT (US)

(72) Inventor: Caleb Garrett, Essex, CT (US)

(73) Assignee: WHELEN ENGINEERING COMPANY, INC., Chester, CT (US)

( * ) Notice: Subject to any disclaimer, the term of this patent is extended or adjusted under 35 U.S.C. 154(b) by 0 days.

(21) Appl. No.: 16/054,526

(22) Filed: Aug. 3, 2018

(51) Int. Cl.
*H04J 3/06* (2006.01)
*H04L 29/06* (2006.01)

(52) U.S. Cl.
CPC .......... *H04J 3/0655* (2013.01); *H04J 3/0682* (2013.01); *H04L 69/28* (2013.01); *H04J 3/0635* (2013.01); *H04L 69/22* (2013.01)

(58) Field of Classification Search
CPC ...... H04J 3/0655; H04J 3/0682; H04J 3/0635; H04J 3/067; H04L 69/28; H04L 69/22
See application file for complete search history.

(56) References Cited

U.S. PATENT DOCUMENTS

| 7,573,914 | B2 | 8/2009 | Ilnicki et al. | |
|---|---|---|---|---|
| 8,432,942 | B1* | 4/2013 | Algie | H04J 3/0691 370/503 |
| 9,450,846 | B1* | 9/2016 | Huang | H04L 43/0858 |
| 2005/0207387 | A1 | 9/2005 | Middleton et al. | |
| 2006/0083264 | A1 | 4/2006 | Jordan et al. | |
| 2006/0083265 | A1* | 4/2006 | Jordan | H04J 3/0682 370/503 |

(Continued)

FOREIGN PATENT DOCUMENTS

EP 2058966 A1 5/2009

OTHER PUBLICATIONS

IEEE el al., "IEEE Standard for a Precision Clock Synchronization Protocol for Networked Measurement and Control Systems", Jul. 2008, IEEE Instrumentation and Measurement Society, IEEE Std 1588™-2008 (Revision of IEEE Std 1588-2002), pp. 1-269 (Year: 2008).*
Chen et al., "An Implementation of the IEEE 1588 MAC with a Packet Identification Encryption", 2012, International Conference on Software and Computer Applications (ICSCA 2012), IPCSIT vol. 41 (2012), pp. 149-152 (Year: 2012).*

(Continued)

*Primary Examiner* — Un C Cho
*Assistant Examiner* — Shah M Rahman
(74) *Attorney, Agent, or Firm* — Dilworth IP, LLC

(57) ABSTRACT

A system, method and computer product for performing a time synchronization between first and second nodes includes the first node performing: generating a synchronization message, transmitting the synchronization message to the second node at a first time, taking a first timestamp in response to the synchronization message being transmitted and transmitting a timestamp message including the first timestamp to the second node at a second time; and the second node performing: receiving the synchronization message and the timestamp message from the first node, taking a second timestamp in response to the synchronization message being received, receiving the timestamp message from the first node, obtaining the first timestamp based on the received timestamp message, obtaining a timing offset between the first timestamp and the second timestamp and performing a time synchronization to the first node based on the timing offset.

23 Claims, 8 Drawing Sheets

(56) References Cited

U.S. PATENT DOCUMENTS

| | | | |
|---|---|---|---|
| 2008/0075120 A1* | 3/2008 | Fourcand | H04J 3/0602 370/503 |
| 2009/0122781 A1* | 5/2009 | Voglewede | H04J 3/0667 370/350 |
| 2010/0034191 A1 | 2/2010 | Schulz et al. | |
| 2011/0122775 A1 | 5/2011 | Zampetti et al. | |
| 2013/0003757 A1* | 1/2013 | Boatright | H04J 3/0697 370/474 |
| 2013/0028265 A1* | 1/2013 | Ronchetti | H04L 43/0858 370/400 |
| 2013/0034197 A1 | 2/2013 | Aweya et al. | |
| 2013/0129345 A1 | 5/2013 | Meng et al. | |
| 2013/0185614 A1 | 7/2013 | Shen et al. | |
| 2015/0071309 A1 | 3/2015 | Aweya et al. | |
| 2015/0092642 A1 | 4/2015 | Geboff et al. | |
| 2015/0092793 A1 | 4/2015 | Aweya | |
| 2015/0180599 A1* | 6/2015 | Geva | H04J 3/0667 370/509 |
| 2016/0249355 A1* | 8/2016 | Chae | H04W 72/1263 |
| 2016/0337877 A1* | 11/2016 | Sorrentino | H04W 72/04 |
| 2016/0345179 A1* | 11/2016 | Chen | H04J 3/0661 |
| 2018/0176266 A1* | 6/2018 | Filart | H04L 65/1066 |

OTHER PUBLICATIONS

Mizrahi, T., "Security Requirements of Time Protocols in Packet Switched Networks", Oct. 2014, Internet Engineering Task Force (IETF), Request for Comments: 7384, pp. 1-36 (Year: 2014).*

Treytl et al., "Traps and pitfalls in secure clock synchronization", Oct. 1-3, 2007, IEEE, 2007 International IEEE Symposium on Precision Clock Synchronization (ISPCS) for Measurement, Control and Communication, pp. 18-24 (Year: 2007).*

Perkins et al., "1588 Power Profile Test Plan", 2014, NISTIR, Version 0.1.23, Total pp. 3 (Year: 2014).*

Cotiga et al., Hands-On: Thread Stack Advanced Class, NXP FTF 2016 Technology Forum, May 18, 2016, 149 pages.

Dorneles et al., "FTSP+: A MAC Timestamp independent flooding time synchronization protocol", May 2016, 13 pages.

Maróti et al., "The Flooding Time Synchronization Protocol", SenSys '04 Proceedings of the 2nd international conference on Embedded networked sensor systems, Nov. 3-5, 2004, ACM New York, NY, USA, 11 pages.

International Search Report and Written Opinion issued in PCT International Application No. PCT/US2018/045158 dated Nov. 19, 2018.

* cited by examiner

PRECISION TIME SYNCHRONIZATION OVER STANDARDIZED NETWORKING PROTOCOLS

TECHNICAL FIELD

The present invention relates to a time synchronization technique between network nodes, and more particularly to a method for performing a time synchronization between network nodes over a multi-hop network and a network system using the method.

BACKGROUND

In many applications including real-time systems that requires events to occur simultaneously across network nodes with millisecond or sub-millisecond precision, a time synchronization has become more important.

When such systems are required to operate over a wireless network, the problem of establishing a common time base can be a difficult one to solve due to non-deterministic medium access control in the networking stack.

Modern computing systems traditionally adopt one or more standardized networking interfaces for communicating with a variety of remotely located devices. Wi-Fi®, Bluetooth®, ZigBee®, Thread, and Ethernet are some examples of standardized networking protocols and interfaces that are pervasive among consumer and industrial computing systems. It is preferable to implement these standardized protocols over developing a proprietary protocol as a means of interoperability with existing electronic devices and reduced development time. While each standardized networking protocol has advantages and disadvantages in terms of throughput, power consumption, range, and cost, they all lack the capability to synchronize time across the network and therefore have inherently limited use in real-time systems.

Various time synchronization methods have been developed as follows, but they all exhibit many technical problems in accuracy and compatibility with devices using existing standardized protocols.

By way of examples only, "The Flooding Time Synchronization Protocol" to Maroti has proposed taking medium-access control (MAC)-layer timestamps to determine a time offset between two neighboring nodes. However, Maroti requires hardware timestamping, which is not widely available in hardware such as microcontrollers and microprocessors. It also requires custom MAC frames to be exchanged across the network to synchronize nodes, thus resulting in many problems when working with an existing protocol or a third-party networking stack that does not have any provisions for sending custom MAC frames. Moreover, Maroti requires that a timestamp of a transmitter triggering the time synchronization be embedded within a synchronization message itself, which is impossible for protocols using a MAC or application layer encryption.

To address Maroti's dependency on the MAC-layer timestamping, "FTSP+: A MAC Timestamp Independent Flooding Time Synchronization Protocol" to Dorneles has proposed using an interrupt handler to avoid hardware timestamping. However, Dorneles shares all other flaws with Maroti. Additionally, Dorneles takes the unusual step of using the interrupt which signals the end of a clear channel assessment (CCA). This allows one to take a timestamp at the application layer then calculate the delay sending a message between the application layer and the physical layer. This assumes that a collision could not occur after the CCA, which would be particularly problematic if that message were to be retransmitted without replacing the timestamp data. Furthermore, it is not necessarily likely that all radio hardware will have access to this interrupt.

In addition, while U.S. Patent Publication No. 2015/0071309 to Aweya has proposed a method for synchronizing a master and a slave over a multi-hop network, it does not give a solution for synchronizing more than two devices, or synchronizing devices in a decentralized network (no master). However, Aweya also requires hardware timestamping, which is not widely available in microcontrollers and microprocessors. Further, Aweya implies that the synchronization message is defined by the content within the message payload, which in some protocols such as Thread or Bluetooth may be encrypted. Thus, it is unclear how this time synchronization method might be applied to a protocol utilizing a MAC or application layer encryption without breaking it.

Thus, there is a need for a new time synchronization method to address the aforementioned drawbacks of the previously proposed time synchronization methods.

SUMMARY OF THE INVENTION

Aspects of the present invention are a method for performing a time synchronization between network nodes and a system using the method.

In one aspect there is provided a network system comprising a first node and a second node. The first node is configured to generate a synchronization message including a synchronization indication ID, transmit the synchronization message to the second node over a network, take a first timestamp in response to the synchronization message being transmitted over the network, and transmit a timestamp message including the first timestamp to the second node at a second time over the network. The second node is configured to receive the synchronization message and the timestamp message from the first node, take a second timestamp in response to the synchronization message being received from the first node, obtain the first timestamp based on the received timestamp message, obtain a timing offset between the first timestamp and the second timestamp, and perform a time synchronization based on the timing offset. The first and second times are different from each other. The synchronization indication ID is formed by modifying one or more of source-related fields from a standard message format which is compliant to a network protocol implemented in each of the first and second nodes.

In another aspect there is provided a method for performing a time synchronization between nodes including a first node and a second node. The method includes: the first node performing: generating a synchronization message including a synchronization indication ID, transmitting the synchronization message to the second node at a first time over a network, taking a first timestamp in response to the synchronization message being transmitted over the network, and transmitting a timestamp message including the first timestamp to the second node at a second time over the network; and the second node performing: receiving the synchronization message and the timestamp message from the first node, taking a second timestamp in response to the synchronization message being received, receiving the timestamp message from the first node, obtaining the first timestamp based on the received timestamp message, obtaining a timing offset between the first timestamp and the second timestamp, and performing a time synchronization to the first node based on the timing offset. The first and second time are different from each other. The synchronization indication ID is formed by modifying one or more of source-related fields from a standard message format which is compliant to a network protocol implemented in each of the first and second nodes.

In still another aspect there is provided a computer program product stored in a non-transitory computer-readable storage medium having computer readable program instructions. The computer readable program instructions are read and carried out by at least one processor for performing a time synchronization between nodes including a first node and a second node. The method includes: the first node performing: generating a synchronization message including a synchronization indication ID, transmitting the synchronization message to the second node at a first time over a network, taking a first timestamp in response to the synchronization message being transmitted over the network, and transmitting a timestamp message including the first timestamp to the second node at a second time over the network; and the second node performing: receiving the synchronization message and the timestamp message from the first node, taking a second timestamp in response to the synchronization message being received, receiving the timestamp message from the first node, obtaining the first timestamp based on the received timestamp message, obtaining a timing offset between the first timestamp and the second timestamp, and performing a time synchronization to the first node based on the timing offset. The first and second times are different from each other. The synchronization indication ID is formed by modifying one or more of source-related fields from a standard message format which is compliant to a network protocol implemented in each of the first and second nodes.

In still another aspect there is provided a network node. The network node includes at least one processor and a transmitter. The at least one processor is configured to generate a synchronization message including a synchronization indication ID, transmit the synchronization message to another network node over a network, take a first timestamp in response to the synchronization message being transmitted over the network, and generate a timestamp message based on the first timestamp. The transmitter configured to: transmit the timestamp to another network node at a second time over the network, the second time being different from the first time. The synchronization indication ID is formed by modifying one or more of source-related fields from a standard message format which is compliant to a network protocol implemented in each of the network node and the another network node.

In still another aspect there is provided a network node. The network node includes at least one processor and a receiver. The receiver is configured to receive a synchronization message including a synchronization indication ID and a timestamp message including a first timestamp from another network node. The first timestamp is taken by the another network node in response to the synchronization message being transmitted to the network node over a network. The at least one processor is configured to take a second timestamp in response to the synchronization message being received from the another network node, obtain the first timestamp based on the received timestamp message, obtain a timing offset between the first timestamp and the second timestamp, and perform a time synchronization to the another network node based on the timing offset.

In still another aspect there is provided a structure of a synchronization message. The synchronization message is generated in a first network node and transmitted to a second network node over a network. The structure includes an unencrypted portion having a synchronization indication ID. Upon identifying the synchronization ID, each of the first and second network nodes takes a timestamp. The structure further includes an encrypted portion including a message ID used for being distinguished from another synchronization message.

In still another aspect there is provided a structure of a synchronization message. The synchronization message is generated in a first network node and transmitted to a second network node over a network. The structure includes a synchronization indication ID and a message ID. The synchronization indication ID is formed by modifying one or more of source-related fields from a standard message format compliant to a network protocol implemented in each of the first and second network nodes. Upon identifying the synchronization indication ID, each of the first and second network nodes takes a timestamp. The message ID is used for being distinguished from another synchronization message.

DETAILED DESCRIPTION OF THE EMBODIMENTS

Figure 1:
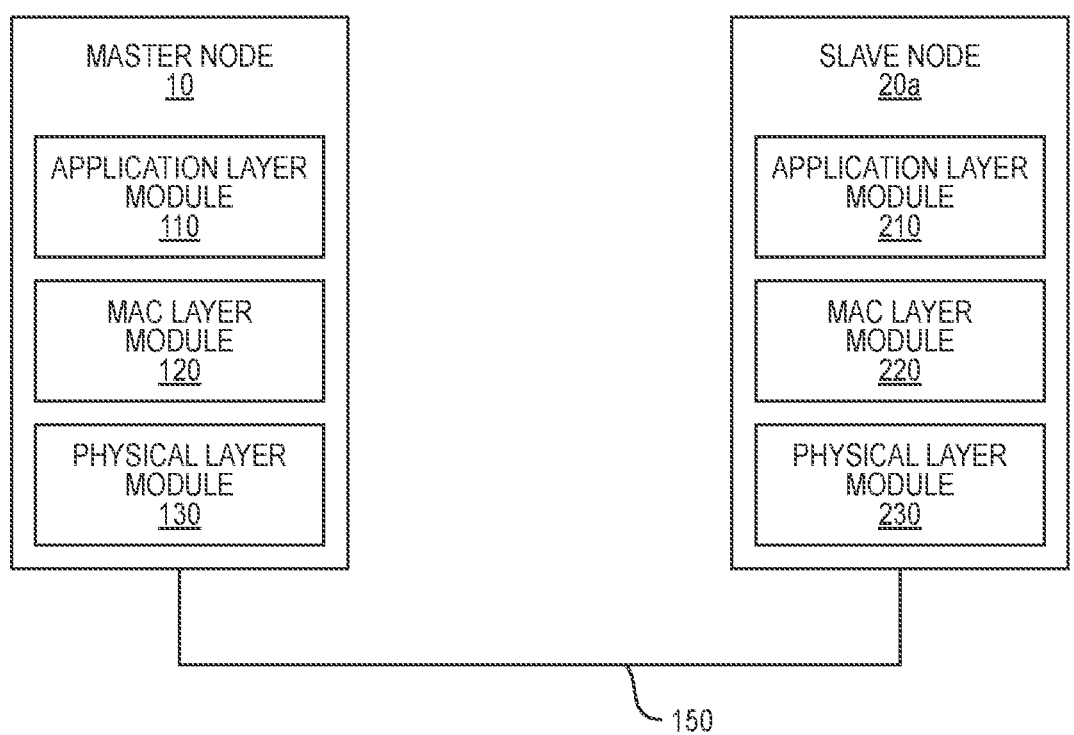
FIG. 1 is a diagram illustrating network protocol stacks of each of a master node and a slave node according to an exemplary embodiment of the present invention.

Embodiments of the present invention will now be described in detail on the basis of the drawings. However, the following embodiments do not restrict the invention claimed in the claims. Moreover, all combinations of features described in the embodiments are not necessarily mandatory for the architecture of the present system and methods. Like numbers are assigned to like elements throughout the description of the embodiments of the present invention.

It will be understood that, although the terms first, second, third, etc. may be used herein to describe various elements. Locations of these elements or orders where the elements are arranged should not be limited by these terms. Instead, these terms are only used to distinguish one element from another element.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A time synchronization method and a network system using the time synchronization method according to an exemplary embodiment of the present invention provide more reliable compatibility with network nodes using existing (and/or standardized) network protocols. For example, a time synchronization event among devices using standardized network protocols by using an application-controlled time synchronization that is compatible with existing standardized networking protocols and software stacks.

The network system includes a master node and a slave node. The master node (or leader node) represents a node that has been elected for the time-synchronization. The slave node (or "N-hop node" when N is an integer equal to or greater than one) represents a node which will be synchronized to the master node.

The term "node" used herein may be understood as a "network node", a "network device", or any devices capable of communicating or networks with other devices.

The term "message" used herein may be understood as a "packet", a "frame", or any names used in communication standards, so that they are interchangeable.

To this end, to avoid the compatibility issue, the method and the network system according to the present invention propose constructing a synchronization message by modifying one or more of fields from a standard message format such as a MAC layer message format or other higher-layer message formats rather than constructing a custom MAC layer message which would break compatibility with other network nodes working with an existing protocol or a third-party networking stack, as discussed earlier.

For example, the modification of the existing standard message format (e.g., MAC message format) is made such that the modification does not cause compatibility issues with other network nodes or other layers of each node, so that the modified message can be recognized as a synchronization message by other network nodes; the modification should easily be detectable regardless of what network protocol the master and slave nodes work with to communicate.

For instance, one or more fields of the MAC message to be modified for an indication of the synchronization message include: source-related fields such as a source network ID field (e.g., personal area network (PAN) ID in IEEE 802.15.4) and a source address field.

In some embodiments, the method and the network system according to the present invention ensure more accurate and reliable time synchronization by taking a timestamp at a lower layer (e.g., physical layer) than a MAC layer. For example, compared to some existing time synchronization methods such as Maroti and Dorneles where a timestamp is taken at a MAC layer or higher and embedded into a synchronization message, the method and the network system according to the present invention utilize transmission and reception complete interrupts on the master and slave nodes, respectively, to take a timestamp of the local clocks as closely as possible to the synchronization message event without requiring special hardware such as an off-the-shelf microcontroller or microprocessor that has this capability.

If a one-hop synchronization between a master node and a slave node is completed, two-hop synchronization can be made between the slave node and one or more other nodes which are one-hop away from the slave node and are two-hops away from the original master node, the original slave node becoming a new master node. In this way, the time synchronization can be performed over multi-hop network nodes in a way of being flooded.

In some embodiments, in order to increase efficiency of the time synchronization or avoid duplicate of time synchronization at a certain node, an origin session ID is assigned to a time synchronization event to distinguish it from other possible time synchronization events.

FIG. 1 is a diagram illustrating network protocol stacks of each of master and slave nodes 10 and 20a according to an exemplary embodiment of the present invention. The slave node 20a is one-hop away from the master node 10. The master and slave nodes 10 and 20a may be parts of a communication network 1 illustrated in FIG. 4. The nodes 10 and 20a each have at least one network protocol implemented, so that they can communicate with each other through a communication channel 150. The communication channel 150 may be wired, wireless, or a combination thereof.

For instance, the network protocol is a communication standard which has been employed in the existing communication networks. In some embodiments, the protocol stacks of the network protocol can be implemented according to an open systems interconnection (OSI) layer model. For example, the protocol stacks include an application layer, a data link layer, and a physical layer, and may further include other layers such as a network layer, a session layer, a transport layer and a presentation layer. Details thereof will be omitted for the sake of simplicity.

The data link layer may include a MAC layer in some network standards such as IEEE 802.15.4. Thus, throughout the present invention, the term MAC layer is used to replace the term data link layer.

Each of the nodes 10 and 20a may include, but is not limited to: an application layer module (see 110 and 210 of FIG. 1) where the functions of the application layer are implemented, a MAC layer module (see 120 and 220 of FIG. 1) where the functions of the MAC layer are implemented, and a physical layer module (see 130 and 230 of FIG. 1) where the functions of the physical layer are implemented. Each node 10 and 20a includes at least one processor and a memory coupled to the processor (as exemplary depicted in FIG. 7), so that at least one processor of the node 10 (or node 20a) performs the functions of the aforementioned layer modules 110 to 130 (or 210 to 230) for the time synchronization between the nodes. In one example, the processor may be implemented using a hardware processor or based on a field-programmable gate array (FPGA) design, but in other embodiments, it may be implemented based on program codes which are stored in the memory or in the hardware processor, and executed by the hardware processor.

Figure 2:
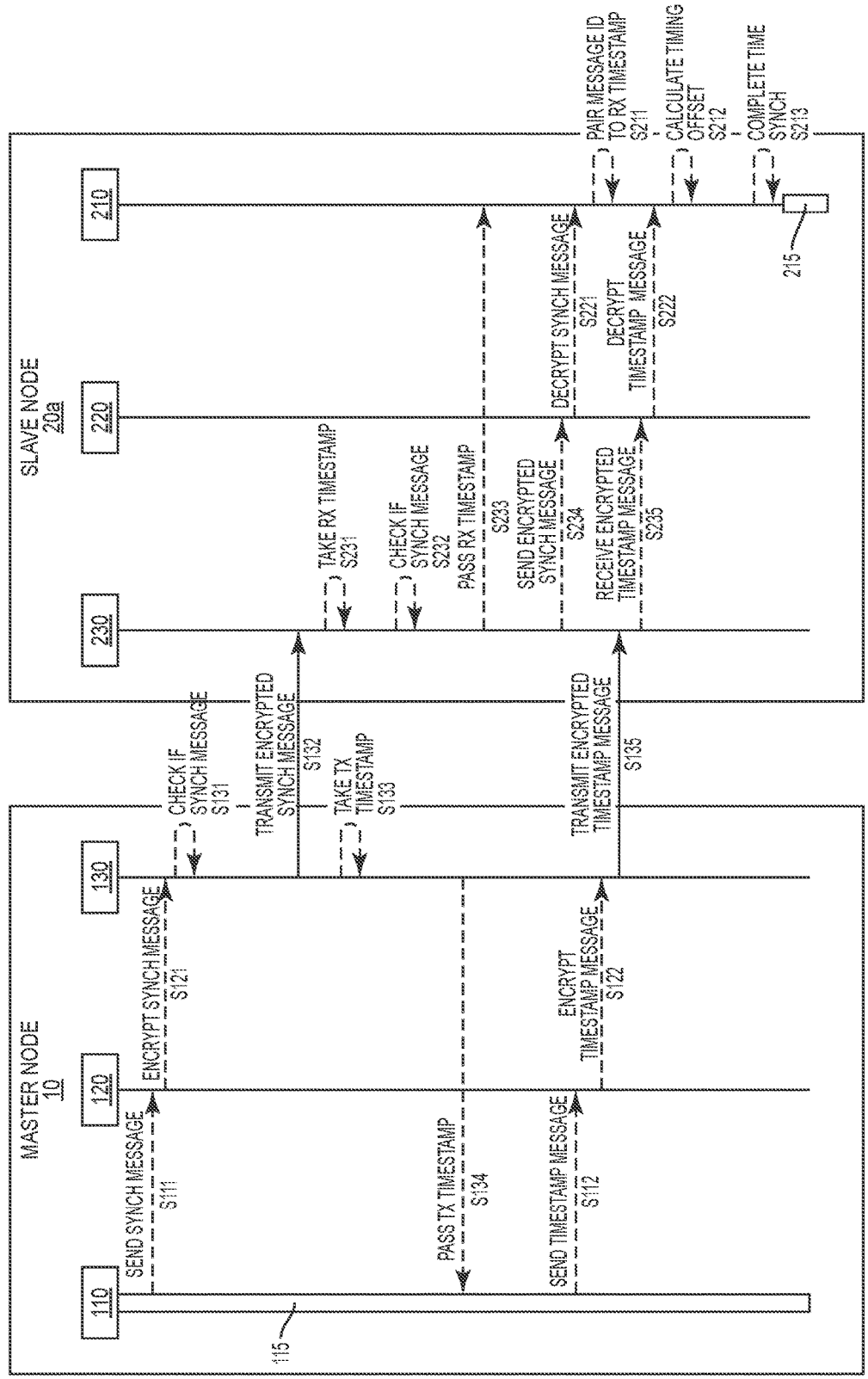
FIG. 2 is a flow chart illustrating a method for performing a time synchronization between the master and slave nodes according to an exemplary embodiment of the present invention.

Referring to FIGS. 1 and 2, in step S111, the application layer module 110 of the master node 10 constructs a synchronization message and sends the synchronization message to the MAC layer module 120. The synchronization message may be a command message to: indicate lower layers such as a physical layer that this message is a synchronization message; and/or instruct the lower layers to take a timestamp.

Figure 3A:
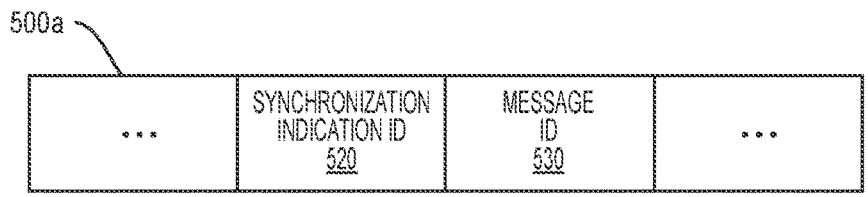
FIG. 3A is a diagram illustrating an example synchronization message constructed by an application layer module according to an exemplary embodiment of the present invention.

Referring now to FIG. 3A, the synchronization message 500a includes a synchronization indication ID 520 and a message ID 530, as exemplary shown in FIG. 3A.

The synchronization message 500a is constructed by modifying some fields from a conventional and/or standard message format which is compliant to a network protocol implemented in each of the nodes 10 and 20a, so that the modification does not affect compatibility with other protocol layers or network entities and could be recognized by them without any additional hardware or network protocol.

For this reason, the modification to the message are generally limited to the following information fields: a source address, a source network ID, or other fields containing message origin information—this information generally might not impact message routing or protocol compatibility.

Generally, the source network ID field is formed to include an identification of a source network where the message originates. In one example, the source network ID field is modified to insert the synchronization indication ID 520 indicating that the message is a synchronization message. In other aspects, the source address or other fields containing message origin information which generally do not impact message routing or protocol compatibility over network may be modified for indication of the synchronization message. For instance, if the two nodes 10 and 20a are implemented to exchange MAC data frames formed based on the IEEE 802.12.4-based network protocol, the source network ID field may correspond to the source PAN ID field, and thus, the synchronization message is formed by modifying the source PAN ID field of the standard IEEE 802.12.4-based MAC frame. The IEEE 802.15.4-based network protocol defines a MAC layer adopted and used by various wireless sensor networks such as Bluetooth, ZigBee, Thread, etc.

By way of example only, the source network ID field is modified by adding a synchronization indication ID in addition to the source network ID. For instance, if the maximum value allowed for the source network ID is "m" (e.g., 0xFFFF if the source network ID is a 16-bit value, or "0xFFFD" for some protocols like Thread protocol), and the designated source network ID is "x" which is an attribute that is exposed to the application layer, the synchronization indication ID may be "m-x", where m and x represent hexadecimal or binary numbers, m is equal to or greater than x.

The synchronization indication ID will be checked by the physical layer module 130 of the master node 10 and the physical layer module 230 of the slave node 20a so as to determine whether the incoming current message is a synchronization message. For instance, the synchronization indication ID (e.g., "m-x") of the incoming message is compared to the designated source network ID (e.g., "x") observed from other outgoing messages, and if they are not equal to each other and/or their sum (e.g., "m-x"+"x") is equal to the maximum value "m" allowable for the source network ID, the physical layer modules 130 and 230 determines the incoming message as the synchronization message.

Embodiments of the present invention for inserting the synchronization indication ID into the synchronization message and checking whether the synchronization indication ID is detected from the current message are not limited thereto. In one example, the synchronization indication ID can be placed any field in the synchronization message if the field remains unencrypted and the modification to the field does not break the protocol compatibility. In another example, Bluetooth advertising messages can be considered in generating a synchronization message. The Bluetooth advertising messages are commonly used for applications such as Apple's iBeacons. These messages are not encrypted which simplifies this task significantly. That is, in case of broadcasting or advertising messages not requiring encryption of the payloads thereof, the synchronization indication ID may be embedded within the payloads of these messages.

Referring back to FIG. 3A, the message ID 530 is an identifier that allows nodes to distinguish between separate synchronization messages. If a synchronization message is received, a timestamp will be taken at a physical layer. The taken timestamp is managed to be paired (or mapped) to a particular synchronization message using a message ID included therein, so that the timestamp paired with the message ID 530 can be distinguished from another timestamp taken in response to another synchronization message having a different message ID from the message ID 530.

Figure 3B:
FIG. 3B is a diagram illustrating an example synchronization message constructed by an application layer module according to an exemplary embodiment of the present invention.

In some embodiments, referring now to FIG. 3B, the synchronization message 500b may further include an origin session ID 540 in addition to the synchronization indication ID 520 and the message ID 530 of FIG. 3A.

The origin session ID 540 is an identifier allowing nodes to distinguish between separate rounds of time synchronization, so that duplication of synchronization processes between nodes can be prevented. More details will be explained with reference to FIG. 5. For instance, a CoAP protocol implements a 16-bit message identifier that can be used for this purpose. The master node 10 (or the slave node 20a) may retain the origin session ID for later on in this process.

A difference between the message ID and the origin session ID can be explained based on the following example. For instance, regarding two nodes that are two-hops away, a time synchronization between the nodes is made based on two-stages as follows: one of the nodes corresponding to a master node is synchronized to an intermediate node that is one-hop away from the master node in the first stage, and the intermediate node is then synchronized to another of the nodes corresponding to a slave node in the second stage. In this example, the same origin session ID is used in all synchronization messages generated during this synchronization process, but different message IDs are assigned for a synchronization message generated during the first stage and another synchronization message generated during the second stage.

Referring back to FIG. 2, in S121, the MAC layer module 120 encrypts a data payload of the synchronization message received from the application layer module 110 and sends the encrypted synchronization message of which data payload has been encrypted. The data payload to be encrypted includes the message ID and/or the origin session ID. The synchronization indication ID is not encrypted, thus allowing the physical layer modules 130 and 230 to recognize the synchronization indication ID without decrypting the encrypted synchronization message. Although not shown in figures, the synchronization message sent by the MAC layer module 120 toward the physical layer module 130 may include a MAC header and/or a MAC footer added according to a MAC layer protocol implemented in the master node 10.

In step S131, the physical layer module 130 determines whether the current message is a synchronization message by checking whether the synchronization indication ID is detected therefrom. Upon determination (or identification) for the synchronization message, the physical layer module 130 transmits the encrypted synchronization MAC message to the slave node 20*a* over a communication channel 150 (S132) and takes a Tx timestamp 620 upon transmit complete of the encrypted synchronization message (S133)

In some embodiments, the physical layer module 130 may make certain preparations prior to transmitting of the message; for instance, the 802.15.4-based protocols may make a clear channel assessment (CCA) of the medium prior to transmitting messages. Once these preparations are complete, the message will be loaded into a transmit buffer of the physical layer module 130. At this moment, the physical layer module 130 determines whether the current message is a synchronization message by checking if there is a modification on the source network ID field. For instance, if the modification is detected, the physical layer module 130 determines that the message is a synchronization message and prepares to take a Tx timestamp of the real-time clock or other time base upon the triggering of the "Transmit Complete" interrupt. This interrupt may be served shortly after the last byte of data pertaining to the synchronization message is transmitted. The Tx timestamp is then passed to the application layer module 110, bypassing the MAC or other inner layers (e.g., a presentation layer, a session layer, a transport layer, a network layer, etc.) between the MAC layer and the application layer of the networking stack (S134). In this case, a data frame including the Tx timestamp might not be modified and the inner layers of the networking stack might not be modified.

By way of example only, during the step S131, in case the received message is not a synchronization message (e.g., if the synchronization indication ID is not identified), the physical layer module 130 may transmit the received message to the slave node 20*a*, but might not take the Tx timestamp and stops the time synchronization process until it receives another synchronization message.

Next, the physical layer module 230 of the slave node 20*a* receives the encrypted message from the physical layer module 130 of the master node 10. It is noted that the physical layer module 230 may have no prior knowledge on whether the message is a synchronization message or not. Thus, upon receiving the encrypted message, the physical layer module 230 takes a Rx timestamp regardless of whether the message is a synchronization message (S231) and then, parses the message to determine whether it is a synchronization message by checking whether the synchronization indication ID is detected therefrom. It is noted that in the step S111, the synchronization indication ID is formed by modifying the source network ID field from a standard message format which is compliant to a network protocol implemented in each of the nodes 10 and 20*a*. Thus, in this example, the synchronization indication ID is detected by checking the source network ID field of the incoming message as is performed by the physical layer module 130 during the step S131.

For instance, when the two nodes 10 and 20*a* are implemented to exchange MAC data frames based on the IEEE 802.12.4-based protocol, the source network ID field may correspond to the source PAN ID, and thus, the synchronization message is formed by modifying the source PAN ID field of the standard IEEE 802.12.4-based MAC frame.

In the step S231, for instance, at the physical layer module 230, a "Receive Complete" interrupt service routine can be called shortly after reception of the last byte of each encrypted message from the physical layer module 130 of the master node 10, and the Rx timestamp is taken upon the receive complete interrupt service routine being called. This "receive complete" interrupt may occur at almost the same moment in time as the "transmit complete" interrupt on the physical layer module 130; e.g., a propagation delay of the message over the communication channel 150 is negligibly short.

Upon the determination that the message is a synchronization message based on a result of performing the step S232, the Rx timestamp is then passed to the application layer module 210, bypassing a MAC layer pertaining to a MAC layer module 220 or other inner layers (e.g., a presentation layer, a session layer, a transport layer, a network layer, etc.) between the MAC layer and the application layer of the networking stack (S233).

During the step S233, if it is determined that the received message is not a synchronization message, the physical layer module 230 does not pass the Rx timestamp to the application layer module 210 and/or discard it.

In regard to the step S232, it is noted that the determination for the synchronization message can be made without decrypting (or deciphering) the payload thereof since the source network ID field including the synchronization indication ID is not encrypted during the step S121.

In step S234, the physical layer module 230 sends the encrypted message to the MAC layer module 220. In some aspects, the step S234 may be performed only upon the determination that the encrypted message is a synchronization message, and the message may be discarded without sending it to the MAC layer module 220 if the message is not a synchronization message. In another aspect, if the message is not a synchronization message, the message may be regarded as a normal data message to be forwarded to the MAC layer module 220, but the Rx timestamp might not be passed to the application layer module 210.

The MAC layer module 220 of the slave node 20*a* may perform operations opposite to those of the MAC layer module 120 of the master node 10. For instance, the MAC layer module 220 decrypts the payload of the encrypted message including the message ID 530 and/or the origin session ID 540 and provides the decrypted payload to the application layer module 210 (S221).

The application layer module 210 obtains the message ID and/or the origin session ID from the decrypted payload sent from the MAC layer module 220 and pairs (or maps) the message ID 530 to the Rx timestamp sent from the physical layer module 130. In some embodiments, the pairing information between the message ID 530 and the Rx timestamp is stored in a memory (not shown) of the slave node 20*a* and will be looked up later to be compared with the Tx timestamp 620 that will be sent from the master node 10. For instance, the Rx timestamp can be mapped to the synchronization message 500*a* or 500*b* along with the message ID 530.

Figure 3C:
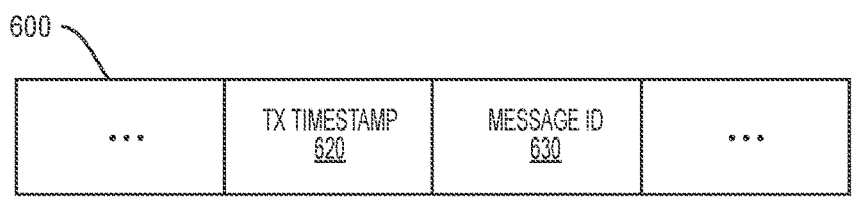
FIG. 3C is a diagram illustrating an example timestamp message constructed by an application layer module according to an exemplary embodiment of the present invention.

In addition, at the master node 10, the application layer module 110 generates a timestamp message 600 based on the Tx timestamp 620 received from the physical layer module 130, as exemplary depicted in FIG. 3C, and thus, the Tx timestamp 620 and a message ID 630 are included in the timestamp message 600. The message ID 630 may be equal to the message ID 530 of the synchronization message 500*a* or 500*b*. The application layer module 110 sends the timestamp message 600 (S112) to the MAC layer module 120. The MAC layer module 120 encrypts the timestamp message 600 and sends the encrypted timestamp message to the physical layer module 130. The physical layer module 130 transmits the encrypted timestamp message to the slave node 20*a* over the communication channel 150 (S135).

At the slave node 20*a*, the physical layer module 230 receives the encrypted timestamp message and sends the encrypted timestamp message to the MAC layer module 220 (S235), thus the encrypted timestamp message is decrypted by the MAC layer module 220 and sent to the application layer module 210 (S222).

It is noted that the application layer module 210 retains the information of the Rx timestamp paired (or mapped) to the message ID 530 as a result of performing the step S211.

Thus, the application layer module 210 extracts the Tx timestamp 620 and the message ID 630 from the decrypted timestamp message and compares the Tx timestamp 620 to the Rx timestamp upon finding a match between the message ID 530 paired to the Rx timestamp and the message ID 630 of the timestamp message 600, so as to calculate a timing offset between the Tx timestamp 620 and the Rx timestamp (S212). Next, the application layer module 210 completes the time synchronization between the master node 10 and the slave node 20*a* based on the calculated time offset (S213). The reference numeral 215 of FIG. 2 represents a state that the slave node 20*a* has been synchronized to the master node 10. Similarly, the reference numeral 115 represents a state that the master node 10 has been synchronized to another reference leader node before the time synchronization process of FIG. 2 or that the master node 10 is a node initially triggering the current time synchronization process.

The time synchronization between two nodes 10 and 20*a* which are one-hop away from each other has been described with reference to FIG. 2. The master and slave nodes 10 and 20*a* are parts of an example network 1 as conceptually depicted in FIG. 4.

In some embodiments, the network 1 according to an exemplary embodiment of the present invention includes, but is not limited: a vehicle-to-vehicle (V2V) communication network, a ubiquitous sensor network (USN), a cellular mobile network, a computer network. For instance, the network 1 is implemented based on at least one of communication protocols such as local area network (LAN), wide area network (WAN), code division multiple access (CDMA), global system for mobile communication (GSM), wideband CDMA, CDMA-2000, time division multiple access (TDMA), long term evolution (LTE), wireless LAN, Bluetooth, IEEE 802.16, IEEE 802.15.4, Thread, or the like. By way of example only, in case the network 1 is a V2V communication network, each node 10, 20*a*-20*d*, 30*a*-30*c*, 40*a* and 40*b* may be a vehicle or a communication module attached to a vehicle.

Figure 4:
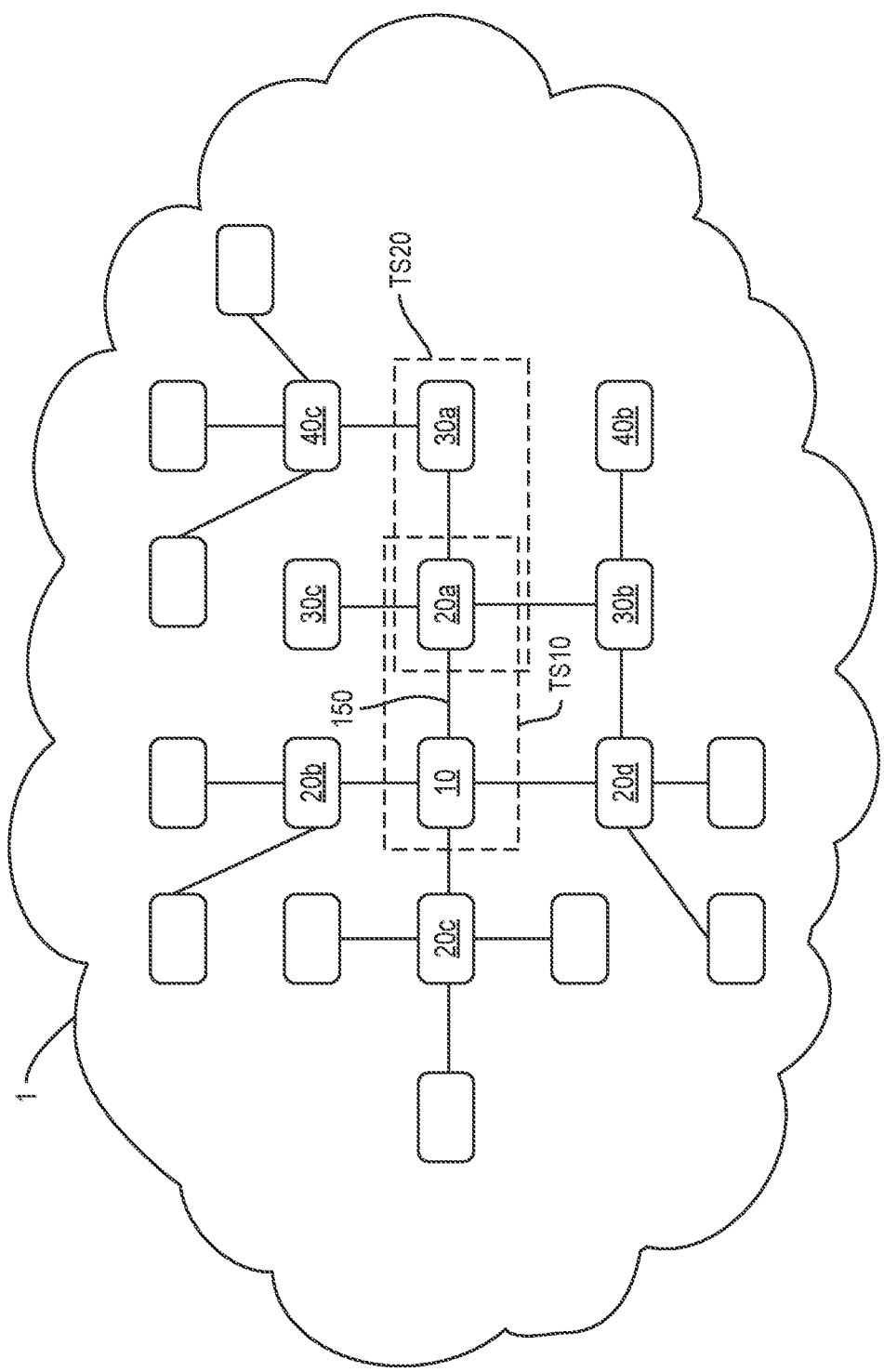
FIG. 4 is a diagram illustrating a communication network where the master and slave nodes of FIG. 1 are located according to an exemplary embodiment of the present invention.

Referring now to FIG. 4, upon completion of the time synchronization of the slave node 20*a* to the master node 10, the slave node 20*a* initiates a time synchronization to other nodes 30*a*-30*c* which are one hop away from the slave node 20*a* and are two-hops away from the master node 10. It is noted that the slave node 20*a* becomes a new master node to the nodes 30*a*-30*c* and each of the nodes 30*a*-30*c* becomes a slave node to the node 20*a*. In this example, a time synchronization between the new master node 20*a* and each new slave node 30*a*-30*c* is performed based on substantially the same process described with reference to FIG. 2, in regard to the time synchronization between the nodes 10 and 20*a*. In FIG. 4, the reference characters TS10 and TS20 indicate a one-hop away time synchronization between the nodes 10 and 20*a* and a two-hops away time synchronization between the nodes 10 and 30*a* through the node 20*a*, respectively.

For instance, in the network 1 of FIG. 4, the aforementioned process between the master and slave nodes 10 and 20*a*, as described with reference to FIG. 2, may occur simultaneously for all or at least two of nodes 20*a* to 20*d* that are one-hop away from the master node 10. The Thread protocol may implement a low-power wireless personal area network (LoWPAN) which allows the application layer to address nodes that are one-hop away using a dedicated IPv6 multicast address, which is convenient for implementing this time synchronization algorithm.

All of these just-synchronized nodes 20*a* to 20*d* may automatically repeat the aforementioned process, each acting simultaneously as a master node just as the master node 10 did in the initial round, so as to synchronize nodes that are one-hop away from the respective nodes 20*a* to 20*d* or that are two-hops away from the master node 10.

This process ripples out through the network 1 hop by hop until all nodes are synchronized. The synchronization waves may all be traced back to the same origin of synchronization based on an origin session ID (e.g., 540 of FIG. 3B).

As described earlier, the origin session ID can be used as an identifier to distinguish a plurality of time synchronization sessions one from another. Not only does the origin session ID prevent separate sessions from interfering with each other, but it also prevents the possibility of a node being synchronized in the same session more than once. Once a node has been synchronized to the current session, it will ignore all other synchronization messages that contain the same origin session ID.

Figure 5:
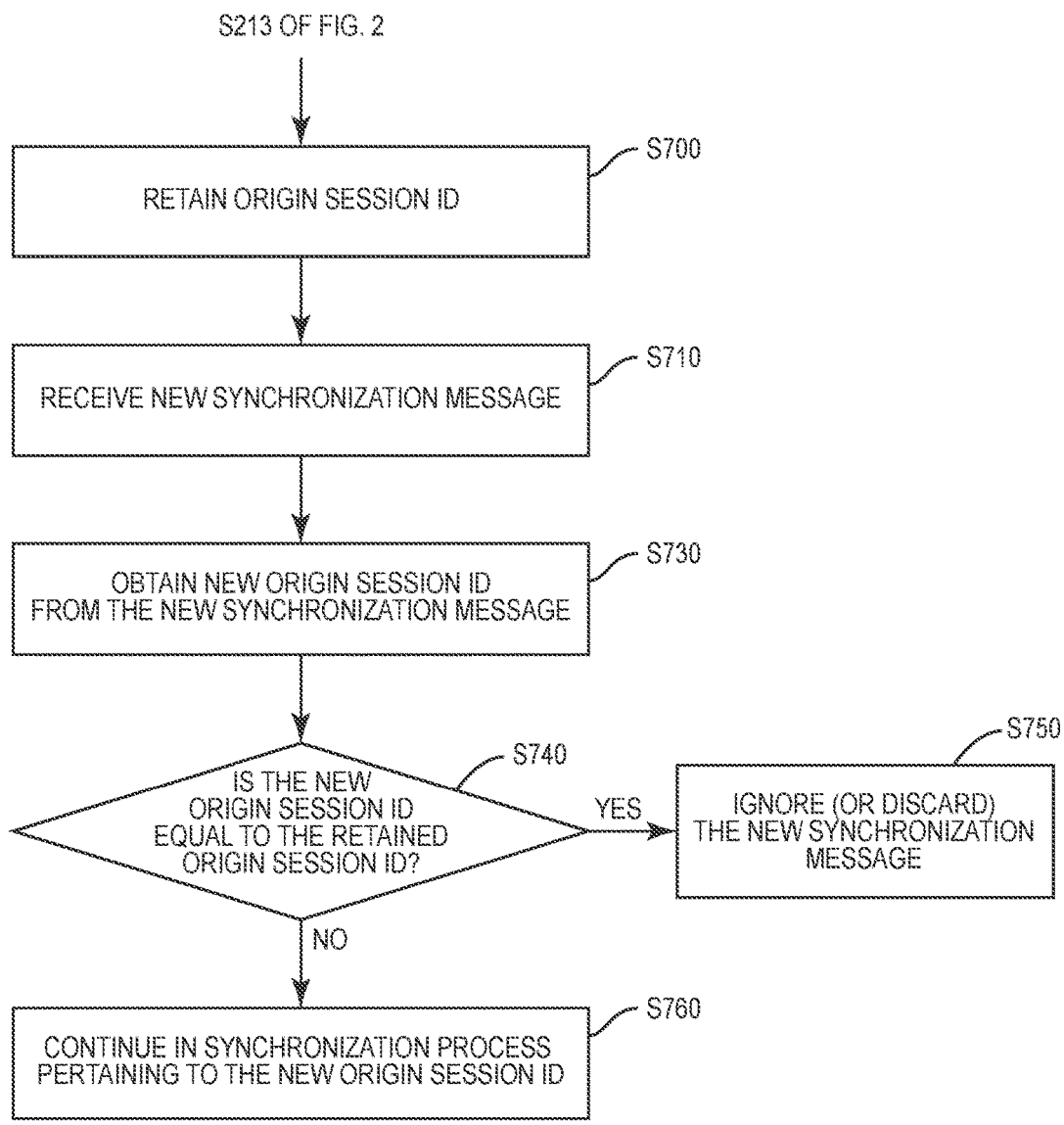
FIG. 5 is a flow chart illustrating an example method of how a node operates to prevent duplication of synchronization processes to the same time synchronization session, according to an exemplary embodiment of the present invention.

FIG. 5 depicts an example method of how the node 20*a* operates to prevent duplication of synchronization operations, according to an exemplary embodiment of the present invention. Referring back to FIGS. 2 and 5, the slave node 20*a* may retain the origin message ID 540 (S700) even if the time synchronization to the master node 10 has already been completed from the step S213 of FIG. 2. Next, when receiving a new synchronization message (S710), the node 20*a* obtains another origin session ID (S730) and determines if a new origin session ID included in the new synchronization message is matched to the origin session ID 540 obtained in the previously processed step S213 (S740). If a match is found; YES, the node 20*a* determines that a time synchronization session associated with the newly received synchronization message has already been completed and thus ignores the receipt of the new synchronization message and/or discard the new message (S750). If the match is not found; NO, the node 20*a* continues to perform the rest of time synchronization process pertaining to the above new origin session ID of the new synchronization message (S760).

Figure 6A:
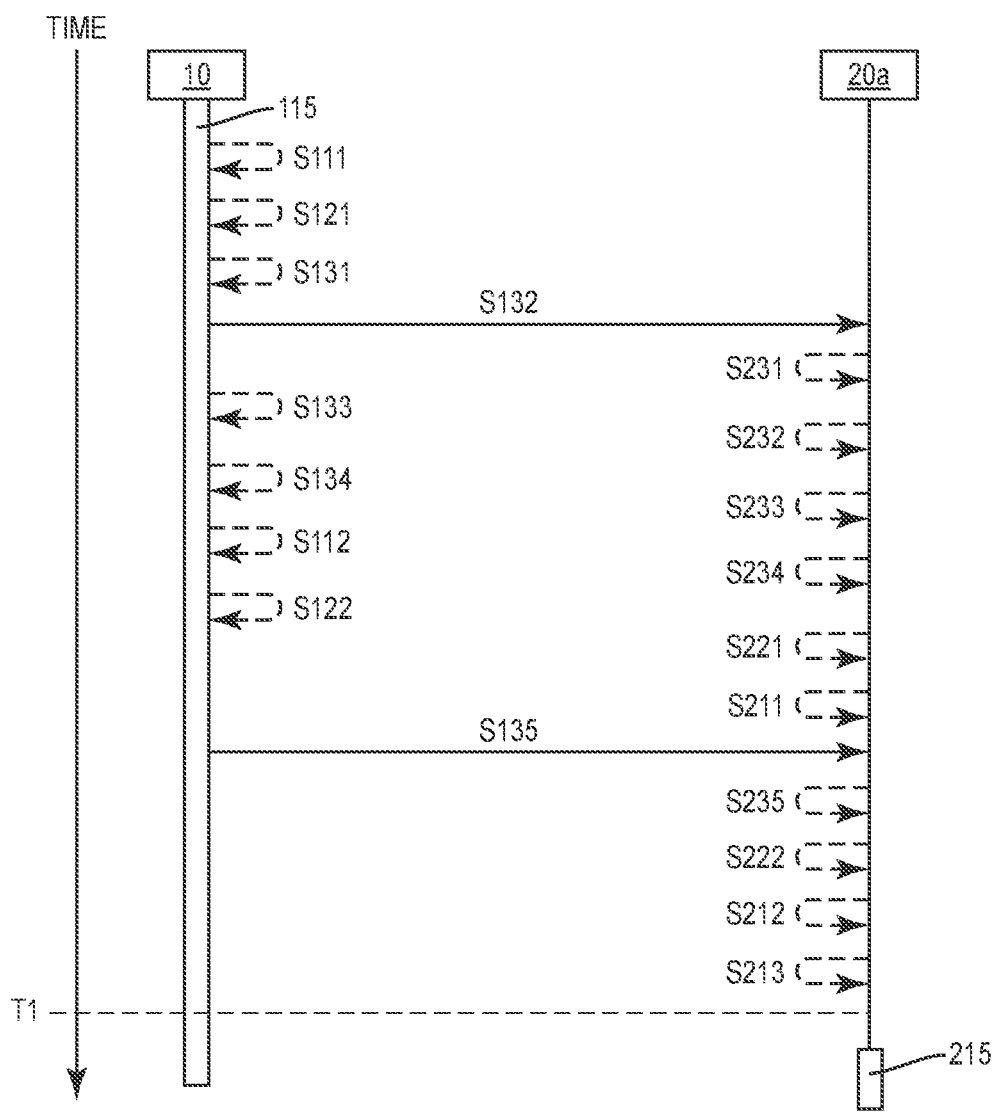
FIG. 6A is a simplified version of the flow chart of FIG. 2 according to an exemplary embodiment of the present invention.
Figure 6B:
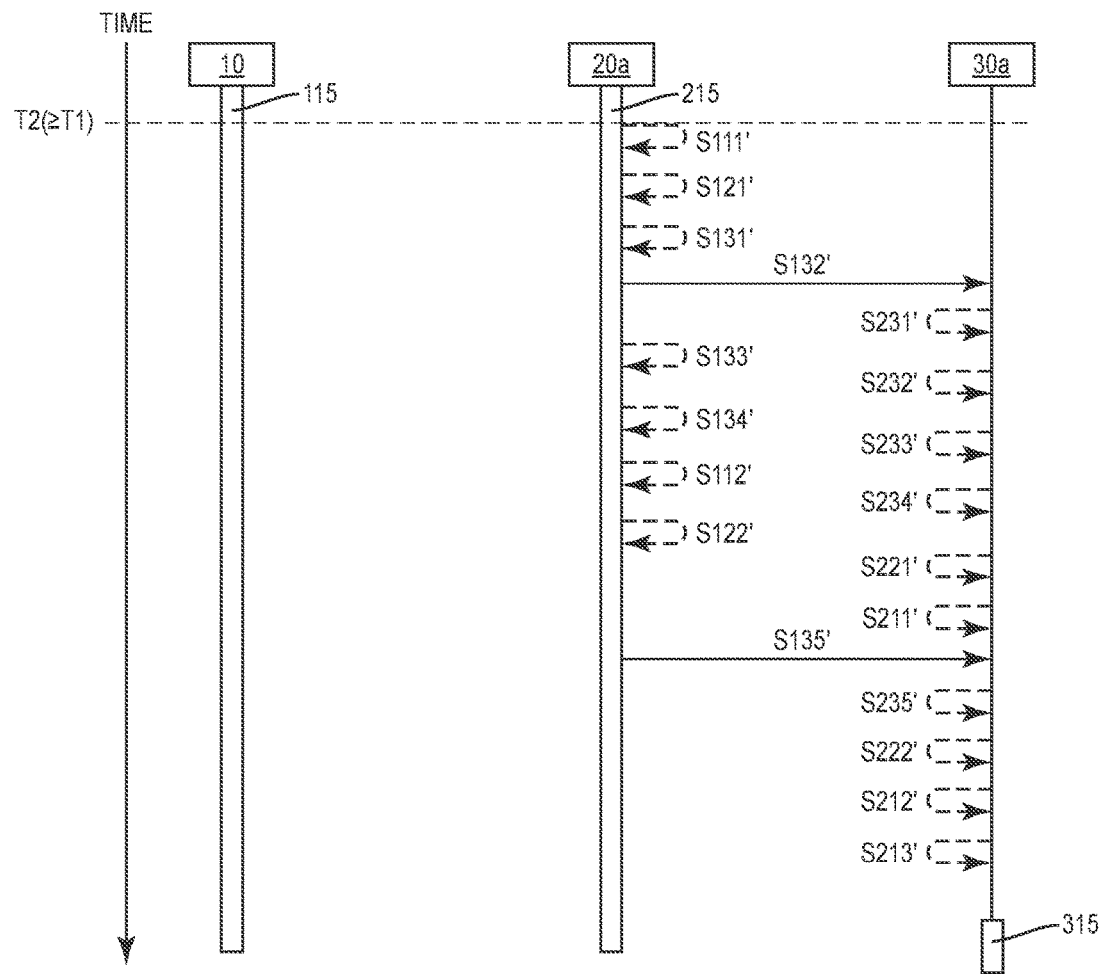
FIG. 6B is a flow chart illustrating a time synchronization processes between two-hops away nodes according to an exemplary embodiment of the present invention.

FIG. 6A is a simplified form of the flow chart of FIG. 2 according to an exemplary embodiment of the present invention. FIG. 6B is a flow chart illustrating a time synchronization processes between two-hops away nodes according to an exemplary embodiment of the present invention. All steps labeled in FIG. 6B are substantially the same as those described with reference to FIG. 6A. For instance, the steps S111', S112', S121', S122', S141', S132', S133', S134' and S135' of FIG. 6B are substantially the same as the steps S111, S112, S121, S122, S141, S132, S133, S134 and S135 of FIG. 6A, respectively. Similarly, the steps S211', S212', S213', S221', S222', S231', S232', S233', S234' and S235' are substantially the same as the steps S211, S212, S213, S221, S222, S231, S232, S233, S234, and S235 of FIG. 6A, respectively. The synchronization of the node 20a to the node 10a has been completed at a time T1 (see FIG. 6A), and the node 20a starts a synchronization with the node 30a at a time T2 which is equal to or greater than T1. The reference numeral 315 represents that the node 30a has been synchronized to the node 20a. Referring back to FIG. 2, the master node 10 may be a node initiating a particular time synchronization session. In this example, the master node 10 is selected as a leader node within the network 1, so that the master node 10 is responsible for triggering each round of time synchronization. The network 1 may be a partition of a larger network including the network 1. In some embodiments, the selection of the leader node is made by an additional external server.

In some embodiments, the time synchronization method according to the present invention might not require two-way communication between nodes during the synchronization process; for instance, the synchronization of nodes ripples out from the leader where the synchronization process originates.

However, in some scenarios, the time synchronization method according to the present invention may require knowledge of which nodes are synchronized on the network, and to which leader they were last synchronized in the event that the elected leader changes. There are a number of methods in which this can be achieved and should be selected based on the method that best fits the application. Some exemplary embodiments to achieve this are detailed below.

In some embodiments, nodes that desire knowledge on which nodes are synchronized sends out a broadcast message that requests a response from each node indicating whether and to whom that node is synchronized.

In some embodiments, the application specifies that unsynchronized nodes behave differently when not synchronized. For instance, unsynchronized nodes may be configured to ignore certain commands when they have not been synchronized within a certain time interval.

In some embodiments, the application demands that unsynchronized nodes periodically report their status as unsynchronized or upon certain network events, such as joining the network or entering a new network partition. This may optionally be used by the partition leader to manually trigger a new round of time synchronization as a means of minimizing the time that unsynchronized nodes are present on the network.

Figure 7:
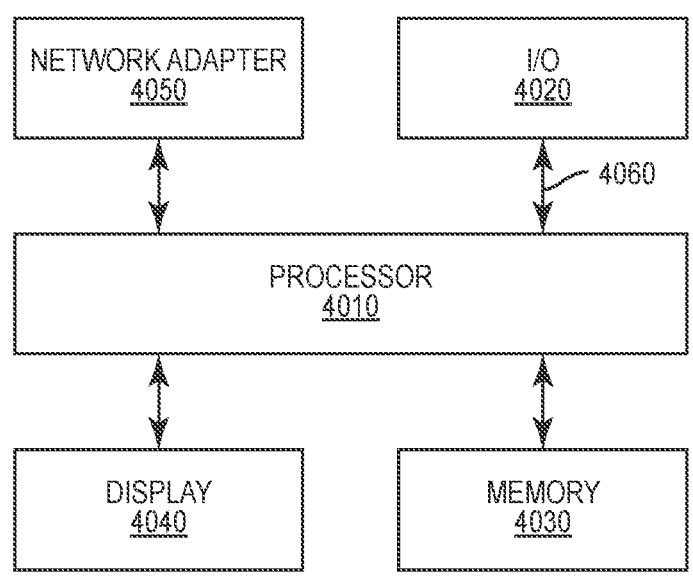
FIG. 7 is a block diagram of a computing system according to an exemplary embodiment of the present invention.

FIG. 7 is a block diagram of a computing system 4000 according to an exemplary embodiment of the present invention.

Referring to FIG. 7, the computing system 4000 may be used as a platform for performing the functions or operations described hereinabove with respect to the nodes 10 and 20a of FIGS. 1 and 2, the methods performed by the nodes 10 and 20a, and/or the methods performed by the application for obtaining the knowledges of which nodes are synchronized on the network and which leader they were last synchronized to.

In addition, the computing system 4000 may be implemented with a ultra-mobile personal computer (UMPC), a net-book, a personal digital assistant (PDA), a portable computer (PC), a web tablet, a wireless phone, a mobile phone, a smart phone, an e-book, a portable multimedia player (PMP), a portable game console, a navigation device, a black box, a digital camera, a digital multimedia broadcasting (DMB) player, a digital audio recorder, a digital audio player, a digital picture recorder, a digital picture player, a digital video recorder, a digital video player, or the like.

Referring to FIG. 7, the computing system 4000 may include a processor 4010, I/O devices 4020, a memory system 4030, a display device 4040, and/or a network adaptor 4050.

The processor 4010 may drive the I/O devices 4020, the memory system 4030, the display device 4040, and/or the network adaptor 4050 through a bus 4060.

The computing system 4000 may include a program module for performing the functions or operations described hereinabove with respect to the nodes 10 and 20a of FIGS. 1 and 2, the methods performed by the nodes 10 and 20a, and/or the methods performed by the application for obtaining the knowledges of which nodes are synchronized on the network and which leader they were last synchronized to according to exemplary embodiments. For example, the program module may include routines, programs, objects, components, logic, data structures, or the like, for performing particular tasks or implement particular abstract data types. The processor (e.g., 4010) of the computing system 4000 may execute instructions written in the program module to perform the functions or operations described with respect to the nodes 10 and 20a of FIGS. 1 and 2, the methods performed by the nodes 10 and 20a, and/or the methods performed by the application for obtaining the knowledge of which nodes are synchronized on the network and which leader they were last synchronized to. The program module may be programmed into the integrated circuits of the processor (e.g., 4010). In an exemplary embodiment, the program module may be stored in the memory system (e.g., 4030) or in a remote computer system storage media.

The computing system 4000 may include a variety of computing system readable media. Such media may be any available media that is accessible by the computer system (e.g., 4000), and it may include both volatile and non-volatile media, removable and non-removable media.

The memory system (e.g., 4030) can include computer system readable media in the form of volatile memory, such as RAM and/or cache memory or others. The computer system (e.g., 4000) may further include other removable/non-removable, volatile/non-volatile computer system storage media.

The computer system (e.g., 4000) can communicate with one or more devices using the network adapter (e.g., 4050). The network adapter may support wired communications based on Internet, local area network (LAN), wide area network (WAN), or the like, or wireless communications based on code division multiple access (CDMA), global system for mobile communication (GSM), wideband CDMA, CDMA-2000, time division multiple access (TDMA), long term evolution (LTE), wireless LAN, Bluetooth, Zig Bee, or the like.

Exemplary embodiments of the present invention may include a system, a method, and/or a computer program product. The computer program product may include a non-transitory computer readable storage medium (e.g., the memory system 4030) having computer readable program instructions thereon for causing a processor to carry out aspects of the present invention.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EEPROM or Flash memory), a static random access memory (SRAM), a portable compact disc read-only memory (CD-ROM), a digital versatile disk (DVD), a memory stick, a floppy disk, or the like, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to the computing system 4000 from the computer readable storage medium or to an external computer or external storage device via a network. The network may include copper transmission cables, optical transmission fibers, wireless transmission, routers, firewalls, switches, gateway computers and/or edge servers. A network adapter card (e.g., 4050) or network interface in each computing/processing device receives computer readable program instructions from the network and forwards the computer readable program instructions for storage in a computer readable storage medium within the computing system.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the computing system (e.g., 4000) through any type of network, including a LAN or a WAN, or the connection may be made to an external computer (for example, through the Internet using an Internet Service Provider). In an exemplary embodiment, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device, and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated but fall within the scope of the appended claims.

What is claimed is:

1. A network system comprising a first node and a second node, wherein the first node including a first processor is configured to:
   generate, using the first processor, a synchronization message including a synchronization indication ID;
   transmit, using the first processor, the synchronization message to the second node over a network;
   take, using the first processor, a first timestamp in response to the synchronization message being transmitted over the network when the message is being transmitted; and
   transmit, using the first processor, a timestamp message including the first timestamp to the second node at a second time over the network, the second time being different from the first time,
wherein the second node including a second processor is configured to:
   receive, using the second processor, the synchronization message and the timestamp message from the first node;
   take, using the second processor, a second timestamp in response to the synchronization message being received from the first node when the message is being received;
   obtain, using the second processor, the first timestamp based on the received timestamp message;
   obtain, using the second processor, a timing offset between the first timestamp and the second timestamp; and
   perform, using the second processor, a time synchronization to the first node based on the timing offset,
   wherein the synchronization indication ID is formed by modifying a source-related field from a standard message format which is compliant to a network protocol implemented in each of the first and second nodes,
   wherein the modified source-related field contains the synchronization indication ID and source origin information, and
   wherein a value of the synchronization indication ID is determined based on an offset between a value of the source origin information and a maximum allowable value for the modified source-related field.

2. The network system of claim 1, wherein the synchronization message comprises an encrypted portion including a message ID and an unencrypted portion including the synchronization indication ID.

3. The network system of claim 1, wherein subsequent to taking the second timestamp, the second node is further configured to identify the synchronization message based on the synchronization indication ID.

4. The network system of claim 3, wherein in response to identifying the synchronization message, the second node is further configured to decrypt the encrypted portion of the synchronization message to obtain a message ID included in the synchronization message.

5. The network system of claim 4, wherein the second node is further configured to pair the second timestamp with the obtained message ID.

6. The network system of claim 5, wherein the second node is further configured to calculate the timing offset between the first and second timestamps, in response to determining that another message ID of the timestamp message transmitted from the first node is equal to the message ID paired with the second timestamp.

7. The network system of claim 1, wherein the network system further a third node, and subsequent to the second node completing the time synchronization to the first node, the second node is further configured to initiate another time synchronization with the third node by generating another synchronization message to transmit said another synchronization message to the third node.

8. The network system of claim 1, wherein the second node is one-hop away from the first node, the third node is one-hop away from the second node, and the third node is two-hops away from the first node.

9. The network system of claim 1, wherein a message ID of the another synchronization message generated by the second node is different from the message ID of the synchronization message generated by the first node.

10. The network system of claim 1, wherein the one or more of the source-related fields comprise a source network ID field.

11. A method for performing a time synchronization between nodes including a first node and a second node, comprising:
   generating, by a first processor of the first node, a synchronization message including a synchronization indication ID;
   transmitting, by the first processor of the first node, the synchronization message to the second node at a first time over a network;
   taking, by the first processor of the first node, a first timestamp in response to the synchronization message being transmitted over the network when the message is being transmitted;
   transmitting, by the first processor of the first node, a timestamp message including the first timestamp to the second node at a second time over the network, the second time being different from the first time,
   wherein the synchronization indication ID is formed by modifying a source-related field from a standard message format which is compliant to a network protocol implemented in each of the first and second nodes,
   wherein the modified source-related field contains the synchronization indication ID and source origin information, and
   wherein a value of the synchronization indication ID is determined based on an offset between a value of the source origin information and a maximum allowable value for the modified source-related field.

12. The method of claim 11, further comprising:
   receiving, by the second node, the synchronization message and the timestamp message from the first node;
   taking, by the second node, a second timestamp in response to the synchronization message being received when the message is being received;
   receiving, by the second node, the timestamp message from the first node; obtaining, by the second node, the first timestamp based on the received timestamp message;
   obtaining, by the second node, a timing offset between the first timestamp and the second timestamp; and
   performing, by the second node, a time synchronization to the first node based on the timing offset.

13. The method of claim 11, wherein the synchronization message comprises an encrypted portion including a message ID and unencrypted portion including the synchronization indication ID.

14. The method of claim 12, further comprising:
identifying, by the second node, the synchronization message based on the synchronization indication ID, subsequent to taking the second timestamp.

15. The method of claim 14, further comprising:
decrypting the encrypted portion of the synchronization message to obtain a message ID included in the synchronization message, in response to identifying the synchronization message.

16. The method of claim 15, further comprising pairing, by the second node, the second timestamp with the obtained message ID.

17. The method of claim 16, wherein the calculating the timing offset between the first and second timestamps is performed in response to determining that another message ID of the timestamp message transmitted from the first node is equal to the message ID paired with the second timestamp.

18. The method of claim 11, wherein the one or more of the source-related fields comprise a source network ID field.

19. The method of claim 12, wherein the second node is one-hop away for the first node.

20. A computer program product stored in a non-transitory computer-readable storage medium having computer readable program instructions, the computer readable program instructions read and carried out by a first processor and a second processor for performing a time synchronization between nodes including a first node and a second node, wherein the method comprises:
generating, using the first processor of the first node, a synchronization message including a synchronization indication ID;
transmitting, using the first processor of the first node, the synchronization message to the second node at a first time over a network;
taking, using the first processor of the first node, a first timestamp in response to the synchronization message being transmitted over the network when the message is being transmitted;
transmitting, using the first processor of the first node, a timestamp message including the first timestamp to the second node at a second time over the network, the second time being different from the first time;
receiving, using the second processor of the second node, the synchronization message and the timestamp message from the first node;
taking, using the second processor of the second node, a second timestamp in response to the synchronization message being received when the message is being received;
receiving, using the second processor of the second node, the timestamp message from the first node;
obtaining, using the second processor of the second node, the first timestamp based on the received timestamp message;
obtaining, using the second processor of the second node, a timing offset between the first timestamp and the second timestamp; and
performing, using the second processor of the second node, a time synchronization to the first node based on the timing offset,
wherein the synchronization indication ID is formed by modifying a source-related field from a standard message format which is compliant to a network protocol implemented in each of the first and second nodes,
wherein the modified source-related field contains the synchronization indication ID and source origin information, and
wherein a value of the synchronization indication ID is determined based on an offset between a value of the source origin information and a maximum allowable value for the modified source-related field.

21. The computer program product of claim 20, wherein the synchronization message comprises an encrypted portion including a message ID and unencrypted portion including the synchronization indication ID.

22. The computer program product of claim 20, wherein the one or more of the source-related fields comprise a source network ID field.

23. A network node comprising at least one processor, is configured to:
generate, using the at least one processor, a synchronization message including a synchronization indication ID;
transmit, using the at least one processor, the synchronization message to another network node over a network;
take, using the at least one processor, a first timestamp in response to the synchronization message being transmitted over the network when the message is being transmitted; and
generate, using the at least one processor, a timestamp message based on the first timestamp; and
transmit, using the at least one processor, the timestamp to another network node at a second time over the network, the second time being different from the first time
wherein the synchronization indication ID is formed by modifying a source-related field from a standard message format which is compliant to a network protocol implemented in each of the first and second nodes,
wherein the modified source-related field contains the synchronization indication ID and source origin information, and
wherein a value of the synchronization indication ID is determined based on an offset between a value of the source origin information and a maximum allowable value for the modified source-related field.

* * * * *